(12) United States Patent
Herbon

(10) Patent No.: US 9,683,341 B2
(45) Date of Patent: Jun. 20, 2017

(54) BLADE FOR REMOVING MATERIAL FROM SURFACES

(71) Applicant: Thomas G. Herbon, Troy, MI (US)

(72) Inventor: Thomas G. Herbon, Troy, MI (US)

( * ) Notice: Subject to any disclaimer, the term of this patent is extended or adjusted under 35 U.S.C. 154(b) by 0 days.

(21) Appl. No.: 14/927,979

(22) Filed: Oct. 30, 2015

(65) Prior Publication Data

US 2017/0121921 A1    May 4, 2017

(51) Int. Cl.
| | | |
|---|---|---|
| *A01B 1/00* | (2006.01) | |
| *A01D 9/00* | (2006.01) | |
| *A01D 11/00* | (2006.01) | |
| *E01H 5/02* | (2006.01) | |
| *A01B 1/02* | (2006.01) | |

(52) U.S. Cl.
CPC ........ *E01H 5/02* (2013.01); *A01B 1/02* (2013.01)

(58) Field of Classification Search
CPC .............. A01B 1/02; A21B 3/003; E01H 5/02
USPC ........................................... 294/49, 54.5, 56
See application file for complete search history.

(56) References Cited

U.S. PATENT DOCUMENTS

| | | | |
|---|---|---|---|
| 787,921 A | | 4/1905 | Hooper |
| 845,549 A | | 2/1907 | Henry |
| 1,206,235 A | | 11/1916 | Luther |
| 1,232,361 A | | 7/1917 | Logston |
| 1,779,090 A | | 10/1930 | Fick |
| 2,484,409 A | | 10/1949 | Jameson |
| 2,598,952 A | | 6/1952 | Weingart |
| 2,772,490 A | | 12/1956 | Hnastchenko |
| 2,909,385 A | * | 10/1959 | Meredich ............ A01B 1/04 172/378 |
| 3,218,738 A | | 11/1965 | Bowerman |
| 4,865,373 A | | 9/1989 | Hudson |
| 5,228,734 A | * | 7/1993 | Pollastro ............ E01H 5/02 294/51 |
| 5,419,600 A | * | 5/1995 | Tisbo ................ E01H 5/02 294/54.5 |
| 5,727,830 A | * | 3/1998 | Asher ................ E01H 5/02 294/54.5 |
| D395,212 S | * | 6/1998 | Vosbikian ............... D8/10 |
| 5,906,060 A | | 5/1999 | Tonry |
| D452,759 S | * | 1/2002 | Spear .................... D32/46 |
| 6,338,511 B1 | * | 1/2002 | Douglas ............ A01B 1/02 294/49 |

* cited by examiner

*Primary Examiner* — Stephen Vu

(57) ABSTRACT

A blade is provided having runners on the blade that extend forward of the blade's leading edge. These runners traverse surface irregularities allowing the blade to avoid colliding with surface irregularities.

19 Claims, 5 Drawing Sheets

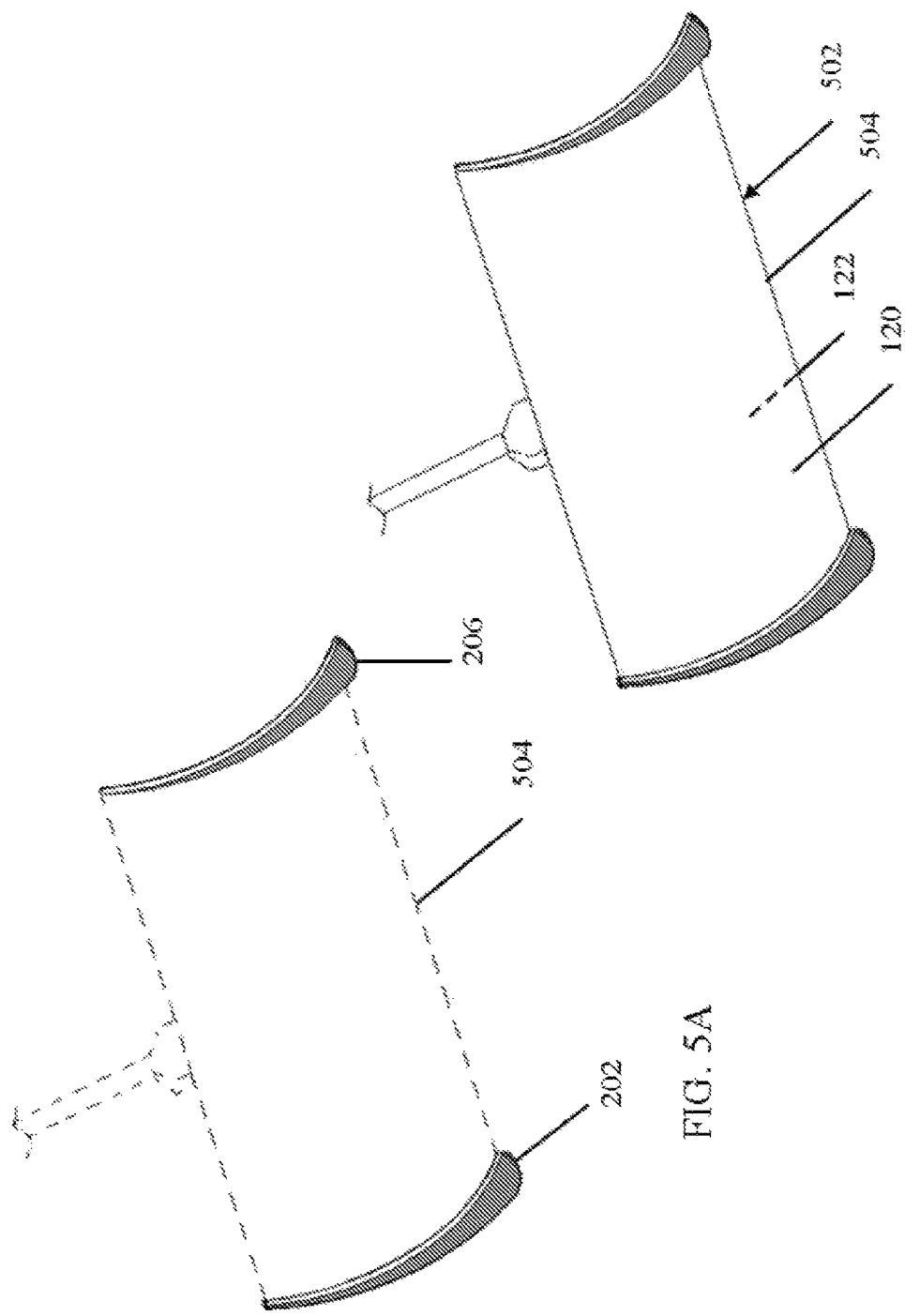

BLADE FOR REMOVING MATERIAL FROM SURFACES

TECHNICAL FIELD

This invention relates to blades for removing material (e.g., snow, dirt, ash) from surfaces.

BACKGROUND

Traditional shoveling of material or debris involves lifting and throwing material, pushing or some combination of pushing and throwing using a shovel or other apparatus. The following patent(s) disclose various shovels (U.S. Pat. Nos. 5,906,060; 1,206,235; 1,232,361; 2,460,560; 2,598,952, 2,772,490; 2,846,785; 2,852,872; 2,484,409 and 5,271,169). Material is removed from surfaces by sliding the blade across the surface, collecting the material on the blade and then moving the material to a desired location and tilting or lifting the blade to remove the material from the blade. Existing shovels or blades sometimes lose all forward momentum when encountering surface irregularities. This results in lost efficiency and requires increased effort and time by the operator.

SUMMARY

According to the first embodiment of the invention comprising a blade is provided. The blade may include a handle, an elongated member, and a blade body. The elongated member may have a first end and a second end spaced apart from the first end. The handle may be configured to receive the first end of the elongated member. The blade body may be configured to receive the second end of the elongated member. The blade body may include a first surface, a second surface, a first side, a second side, a first edge, a second edge, and a first runner. The second surface may be disposed opposite the first surface. The first side may have a first profile and the second side may have a second profile, with the second side disposed opposite and substantially parallel to the first side. The first edge may extend between the first side and the second side. The second edge may be spaced apart from the first edge and may extend between the first side and the second side. The first runner may be attached to the first side, the first runner having a first runner profile at least partially defined by the first profile and the first runner extending beyond the second edge.

The blade may have a second runner attached to the second side, the second runner having a second runner profile at least partially defined by the second profile and the second runner extending beyond the second edge, the second runner disposed substantially parallel to the first runner. The blade may have a blade body profile for a blade body runner attached to the blade body, the blade body runner having a blade body runner profile at least partially defined by the blade body profile and the blade body runner extending beyond the second edge, the blade body runner disposed substantially parallel to the first runner.

The first runner profile may have an arcuate profile that substantially matches the first profile, a portion of the first runner may not be in plane with the second surface, and a portion of the first runner may not be in plane with the second edge. The second runner profile may have an arcuate profile that substantially matches the second profile, a portion of the second runner may not be in plane with the second surface, and a portion of the second runner may not be in plane with the second edge. The blade body runner profile may have an arcuate profile that substantially matches the blade body profile, a portion of the blade body runner may not be in plane with the second surface, and a portion of the blade body runner may not be in plane with the second edge.

According to the second embodiment of the invention comprising a blade body is provided. The blade body may include a first surface, a second surface, a first side, a second side, an edge, and a first runner. The second surface may be disposed opposite the first surface. The first side may have a first profile and the second side may have a second profile, with the second side disposed opposite and substantially parallel to the first side. The first surface and second surface may define an edge extending between the first side and the second side. The first surface and second surface may define a blade body profile. The first runner may be attached to the first side, the first runner having a first runner profile at least partially defined by the first profile and the first runner extending beyond the edge.

The blade body may have a second runner attached to the second side, the second runner having a second runner profile at least partially defined by the second profile and the second runner extending beyond the second edge, the second runner disposed substantially parallel to the first runner. The blade body may have a blade body runner attached to the blade body, the blade body runner having a blade body runner profile at least partially defined by the blade body profile and the blade body runner extending beyond the edge, the blade body runner disposed substantially parallel to the first runner.

The first runner profile may have an arcuate profile that substantially matches the first profile, a portion of the first runner may not be in plane with the second surface, and a portion of the first runner may not be in plane with the edge. The second runner profile may have an arcuate profile that substantially matches the second profile, a portion of the second runner may not be in plane with the second surface, and a portion of the second runner may not be in plane with the edge. The blade body runner profile may have an arcuate profile that substantially matches the blade body profile, a portion of the blade body runner may not be in plane with the second surface, and a portion of the blade body runner may not be in plane with the edge.

BRIEF DESCRIPTION OF THE DRAWINGS

FIG. 3A is a cross-section of elements of the blade with runners.

FIG. 3B is a side view of elements of the blade with runners.

FIG. 5 is a perspective view of elements of the blade with the embodiment of attached runners.

FIG. 5A is a perspective view of an existing blade with the embodiment of attached runners.

DETAILED DESCRIPTION

Figure 1:
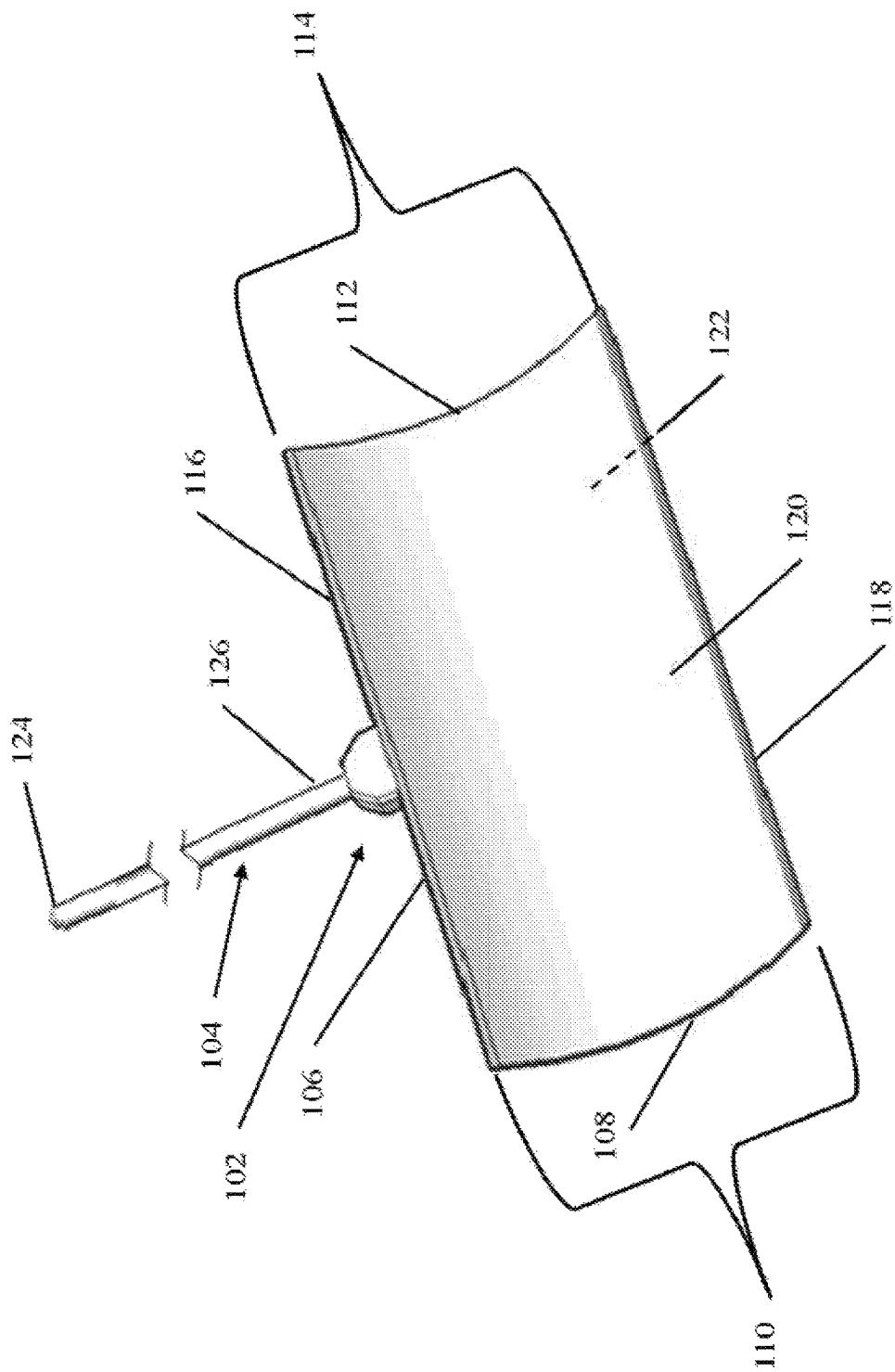
FIG. 1 is a perspective view of elements of the blade.
Figure 2:
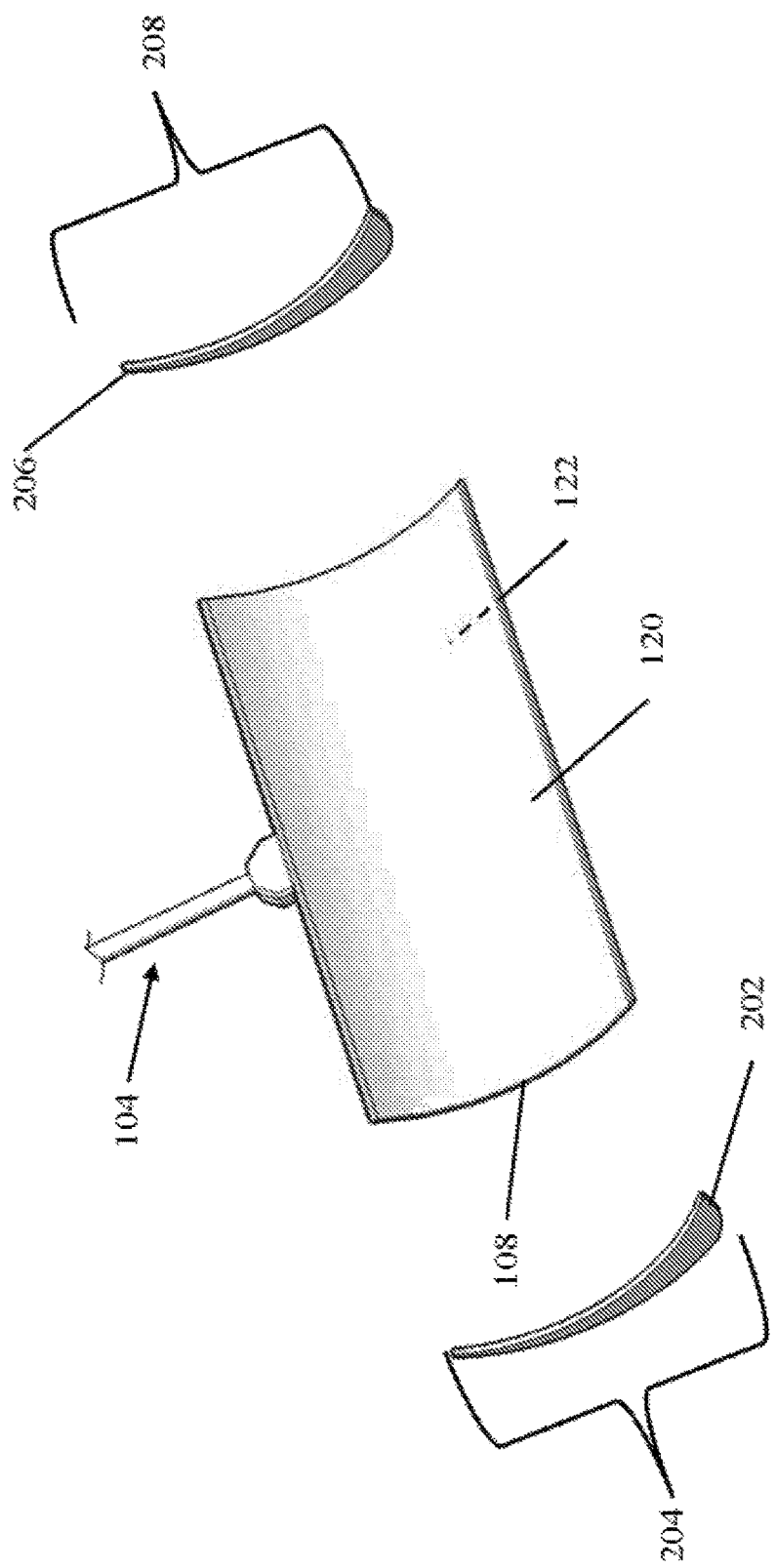
FIG. 2 is an exploded perspective view of elements of the blade with runners.
Figure 3:
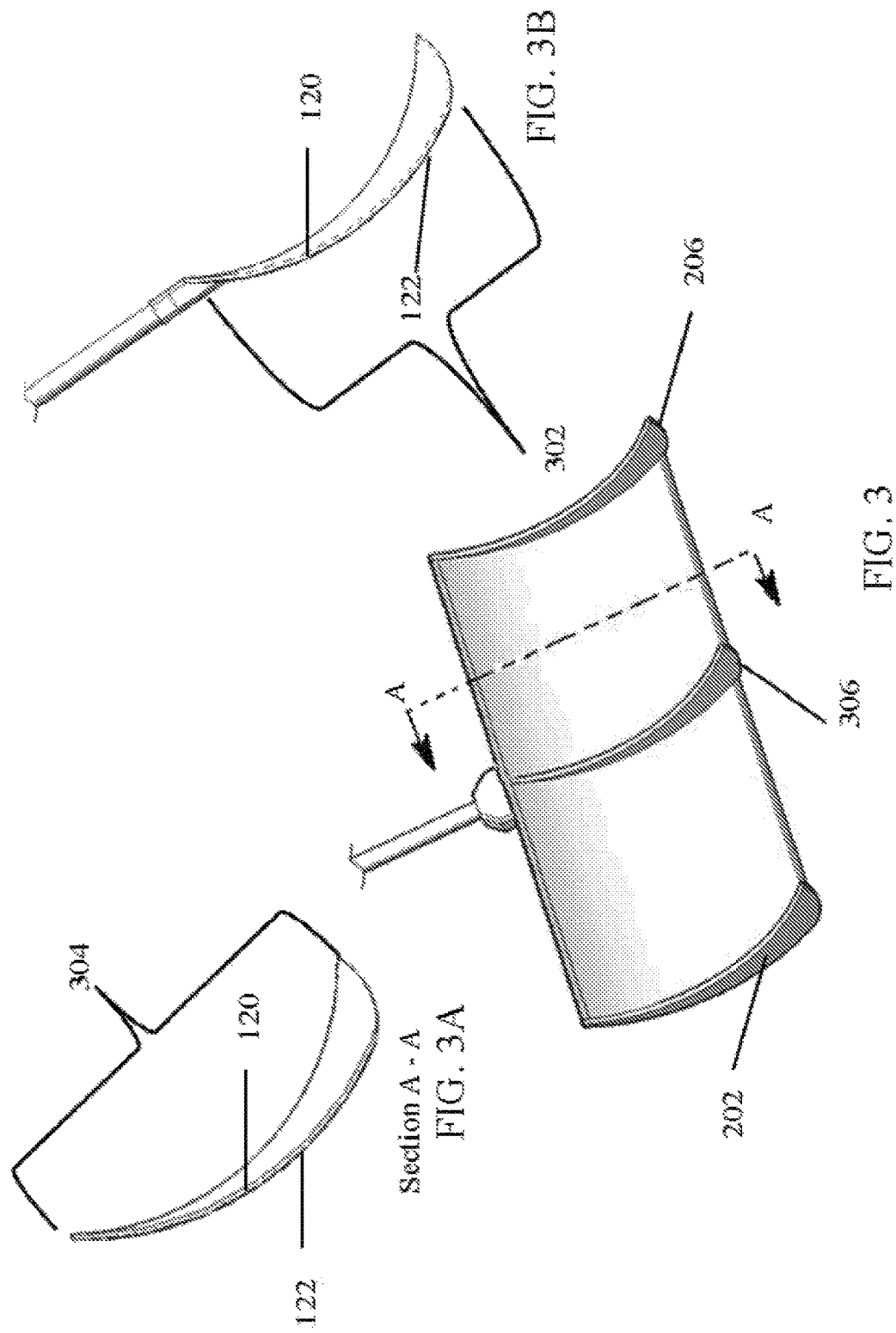
FIG. 3 is a perspective view of elements of the blade with runners.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to the drawings in detail wherein like elements are indicated by like numerals, there is shown a blade 102 that may include an elongated member 104; a blade body 106; a first side 108; a first profile 110; a second side 112; a second profile 114; a first edge 116; a second edge 118; a first runner 202; a first runner profile 204; a second runner 206; and a second runner profile 208. FIG. 400 depicts an embodiment of the invention. See FIGS. 1, 2, 3, 3A, 3B, and 4.

The elongated member 104 may have a first end 124 and a second end 126 spaced apart from the first end 124 and an elongated body extending therebetween. The second end 126 of the elongated member 104 receives the blade body 106.

The blade body 106 has a first side 108 that follows the first profile 110 of the blade 102. The first profile 110 may be defined by a substantially continuous section having a constant radius of curvature. In at least one embodiment, the first profile 110 may be defined by a linear section or a substantially non-continuous section having varying radii of curvature such that it is not piecewise continuous.

The blade body 106 has a second side 112 that follows the second profile 114 of the blade 102. The second profile 114 may be defined by a substantially continuous section having a constant radius of curvature. In at least one embodiment, the second profile 114 may be defined by a linear section or a substantially non-continuous section having varying radii of curvature such that it is not piecewise continuous.

The first runner 202 may abut the first side 108. The first runner 202 and the first side 108 may be substantially aligned with the first runner profile 204 substantially following the first profile 110. Traditionally, the first surface 120 is the concave surface of the blade body 106 whereas the second surface 122 is the convex surface of the blade body 106.

The first profile 110 and the first runner profile 204 may substantially follow the second surface 122 or in some embodiments, the first profile 110 is vertically offset from the first runner profile 204. The offset between the first profile 110 and the first runner profile 204 also offsets the first runner 202 from the first surface 120 and/or the second surface 122 reducing the contact between the blade body 106 and the surface being shoveled.

The second runner 206 may abut the second side 112. The second runner 206 and the second side 112 may substantially aligned with the second runner profile 208 substantially following the second profile 114.

The second profile 114 and the second runner profile 208 may substantially follow the second surface 122 or in some embodiments, the second profile 114 is vertically offset from the second runner profile 208. The offset between the second profile 114 and the second runner profile 208 also offsets the second runner 206 from the first surface 120 and/or the second surface 122 reducing the contact between the blade body 106 and the surface being shoveled.

The blade body profile 302 is substantially defined by the second surface 122. The blade body runner profile 304 may substantially follow the blade body profile 302. The blade body runner 306 may be substantially aligned with the blade body runner profile 304.

The blade body profile 302 and the blade body runner profile 304 may substantially follow the second surface 122 or in some embodiments the blade body profile 302 is vertically offset from the blade body runner profile 304. The offset between the blade body profile 302 and the blade body runner profile 304 also offsets the blade body runner 306 from the first surface 120 and/or the second surface 122 reducing the contact between the blade body 106 and the surface being shoveled.

The first surface 120 and the second surface 122 define the first edge 116, wherein the first edge 116 extends between the first side 108 and the second side 112. The first surface 120 and the second surface 122 define the second edge 118, wherein the second edge 118 extends between the first side 108 and the second side 112. The first edge 116 and the second edge 118 are spaced apart and disposed opposite one another. Traditionally, the first edge 116 is closest to the handle or the "trailing edge" and the second edge 118 is the "scraping" or "leading" edge of the blade body, which contacts the material first and the surface where the material resides.

The first runner 202 extends ahead of the direction of scraping of the second edge 118. When a surface irregularity is encountered the first runner 202 traverses the surface irregularity reducing or avoiding impact with the second edge 118.

The second runner 206 extends ahead of the direction of scraping of the second edge 118. When a surface irregularity is encountered second runner 206 traverses the surface irregularity reducing or avoiding impact with the second edge 118.

The blade body runner 306 extends ahead of the direction of scraping of the second edge 118. When a surface irregularity is encountered blade body runner 306 traverses the surface irregularity reducing or avoiding impact with the second edge 118.

The extension of the runners (first runner 202, second runner 206, and/or blade body runner 306) beyond the second edge 118 allows the blade body 106 to traverse surface irregularities when clearing material from irregular surfaces, while allowing the second edge 118 to maintain contact with the surface being cleared.

When a surface irregularity is encountered by at least one the runners (first runner 202, second runner 206, and/or blade body runner 306) the runners slide up the raised surface allowing the second edge 118 (the "scraping edge") to easily transition to the new surface. The second edge 118 on a blade with runners contacts raised surfaces for a shorter duration of time than the second edge 118 on a blade without runners.

Without the runners (first runner 202, second runner 206, and/or blade body runner 306) extending beyond the second edge 118, the second edge 118 would impact the irregularity, hampering the movement of the blade body 106. The user would be required to lift and reposition the blade on the new surface and reinitiate momentum. The irregularity may also be a gap between resilient surfaces (metal, concrete, etc.) whereby the second edge 118 falls into the gap, hampering momentum when the second edge 118 contacts the other resilient surface. With the extension of the runners (first runner 202, second runner 206, and/or blade body runner 306) beyond the second edge 118, the second edge 118 will not fall into the gap because the runners (first runner 202, second runner 206, and/or blade body runner 306) will "traverse" the gap between resilient surfaces without a hampering of the momentum of blade body 106.

The vertical offset of the runners (first runner 202, second runner 206, and/or blade body runner 306) from the first surface 120 and/or the second surface 122, and the extension of the runners (first runner 202, second runner 206, and/or blade body runner 306) beyond the second edge 118 may allow the blade body 106 to traverse surface irregularities when clearing material from irregular surfaces and keep the second edge 118 in contact with the surface when clearing material from flat surfaces.

Figure 4:
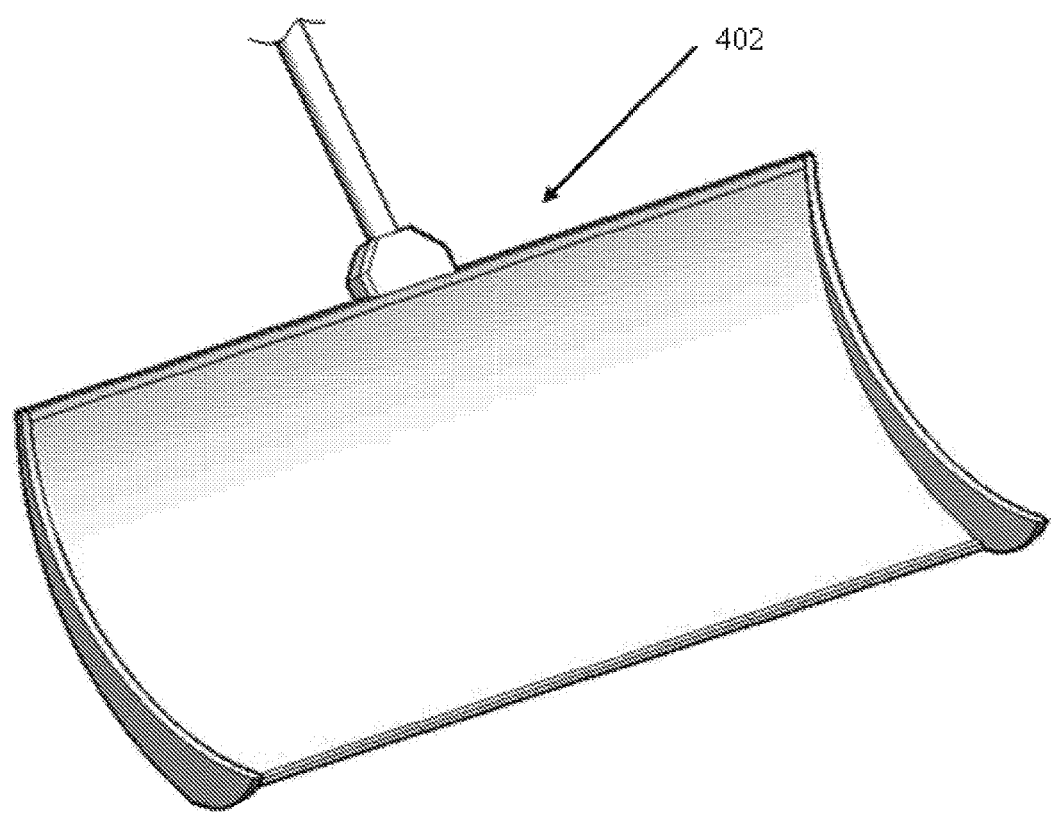
FIG. 4 is a perspective view of an embodiment of the blade with integral runners.

Referring to FIG. 4, the first embodiment 402, the components may be integrally formed to the blade body. The integrally formed components for this embodiment may be: the blade body 106; the first side 108; the first profile 110; the second side 112; the second profile 114; the first edge 116; the second edge 118; first surface 120; the second surface 122; the first runner 202; the first runner profile 204; the second runner 206; the second runner profile 208; the blade body profile 302; the blade body runner profile 304; and the blade body runner 306.

Referring to FIG. 5 and FIG. 5A, the second embodiment 502 the components may be added to an existing blade body. The components to be added on to an existing blade may be: the first runner 202; the first runner profile 204; the second runner 206; the second runner profile 208; the blade body runner profile 304; and the blade body runner 306. In the second embodiment the edge 504 is the second edge 118 "scraping edge" of the first embodiment.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A blade comprising:
   an elongated member having a first end and a second end spaced apart from the first end, and a blade body, the blade body configured to receive the second end of the elongated member, wherein the blade body includes
   a first surface;
   a second surface disposed opposite the first surface;
   a first side having a first profile and a second side having a second profile, with the second side disposed opposite and substantially parallel to the first side,
      a first edge extending between the first side and the second side,
   a second edge spaced apart from the first edge extending between the first side and the second side,
   a first runner attached to the first side, the first runner having a first runner profile at least partially defined by the first profile and the first runner extending beyond the second edge, the first runner profile being vertically offset from the first profile, such that a portion of the first runner extends beneath the first side.

2. The blade of claim 1 further comprises:
   a second runner attached to the second side, the second runner having a second runner profile at least partially defined by the second profile and the second runner extending beyond the second edge, the second runner disposed substantially parallel to the first runner.

3. The blade of claim 2 wherein the second runner profile has an arcuate profile that substantially matches the second profile.

4. The blade of claim 2 wherein at least a portion of the second runner abuts and is disposed perpendicular to the second surface.

5. The blade of claim 1 further comprises:
   a blade body profile
   a blade body runner attached to the blade body, the blade body runner having a blade body runner profile at least partially defined by the blade body profile and the blade body runner extending beyond the second edge, the blade body runner disposed substantially parallel to the first runner.

6. The blade of claim 5 wherein the blade body runner profile has an arcuate profile that substantially matches the blade body profile.

7. The blade of claim 5 wherein at least a portion of the blade body runner abuts and is disposed perpendicular to the second surface.

8. The blade of claim 1 wherein the first runner profile has an arcuate profile that substantially matches the first profile.

9. The blade of claim 1 wherein at least a portion of the first runner abuts and is disposed perpendicular to the second surface.

10. The blade of claim 1, wherein the first runner is offset from at least one of the first surface and the second surface.

11. A blade body comprising:
    a first surface;
    a second surface disposed opposite the first surface;
    a first side having a first profile;
    a second side having a second profile and disposed opposite and substantially parallel to the first side;
    the first surface and second surface define an edge extending between the first side and the second side;
    a blade body profile; and
    a first runner attached to the first side, the first runner having a first runner profile at least partially defined by the first profile and the first runner extending beyond the edge, wherein the first runner profile being vertically offset from the first profile, such that the first runner is offset from at least one of the first surface and the second surface, and a portion of the first runner extends beneath the first side.

12. The blade body of claim 11 further comprises a second runner attached to the second side, the second runner having a second runner profile at least partially defined by the second profile and the second runner extending beyond the edge, the second runner disposed substantially parallel to the first runner.

13. The blade body of claim 12 wherein the first runner profile has an arcuate profile that substantially matches the first profile.

14. The blade body of claim 12 wherein at least a portion of the first runner abuts and is disposed perpendicular to the second surface.

15. The blade body of claim 12 wherein the second runner profile has an arcuate profile that substantially matches the second profile.

16. The blade body of claim 12 wherein at least a portion of the second runner abuts and is disposed perpendicular to the second surface.

17. The blade body of claim 11 further comprises a blade body runner attached to the blade body, the blade body runner having a blade body runner profile at least partially defined by the blade body profile and the blade body runner extending beyond the edge, the blade body runner disposed substantially parallel to the first runner.

18. The blade body of claim 17 wherein the blade body runner profile has an arcuate profile that substantially matches the blade body profile.

19. The blade body of claim 17 wherein at least a portion of the blade body runner abuts and is disposed perpendicular to the second surface.

\* \* \* \* \*